US012530308B2

(12) United States Patent
Mayer et al.

(10) Patent No.: US 12,530,308 B2
(45) Date of Patent: Jan. 20, 2026

(54) DATAFLOW GASKETS FOR HANDLING DATA STREAMS

(71) Applicant: Analog Devices, Inc., Wilmington, MA (US)

(72) Inventors: Christopher Mayer, Dover, MA (US); Sudhir Desai, Mansfield, MA (US); Arash Azizimazreah, Merrimack, NH (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 18/780,879

(22) Filed: Jul. 23, 2024

(65) Prior Publication Data

US 2025/0036587 A1   Jan. 30, 2025

Related U.S. Application Data

(60) Provisional application No. 63/515,432, filed on Jul. 25, 2023.

(51) Int. Cl.
*G06F 13/36* (2006.01)

(52) U.S. Cl.
CPC .......... *G06F 13/36* (2013.01); *G06F 2213/40* (2013.01)

(58) Field of Classification Search
CPC .... G06F 13/36; G06F 2213/40; G06F 15/173; G06F 13/4022; G06N 3/0464; G06N 3/063
See application file for complete search history.

(56) References Cited

U.S. PATENT DOCUMENTS

| 5,650,993 A | * | 7/1997 | Lakshman | .............. H04L 47/10 |
| | | | | 370/236 |
| 6,195,593 B1 | * | 2/2001 | Nguyen | .................. G06F 30/30 |
| | | | | 700/121 |

(Continued)

FOREIGN PATENT DOCUMENTS

| CN | 101620585 A | 1/2010 |
| CN | 113626353 A | 11/2021 |

(Continued)

OTHER PUBLICATIONS

International Search Report and Written Opinion for International Application No. PCT/US2024/039200 dated Oct. 15, 2024, in 13 pages.

(Continued)

*Primary Examiner* — Farley Abad
(74) *Attorney, Agent, or Firm* — Knobbe, Martens, Olson & Bear, LLP

(57) ABSTRACT

Apparatus and methods for facilitating data movement among circuit blocks are disclosed. In certain embodiments, an integrated circuit (IC) includes a network of dataflow gaskets including a first dataflow gasket coupled to a first circuit block and a second dataflow gasket coupled to a second circuit block. The first circuit block can write to the second circuit block by programming output stream registers of the first dataflow gasket for an outgoing write stream that includes a header identifying the second dataflow gasket. The header can be provided by the first dataflow gasket to the second dataflow gasket over the network, and in response to the header reaching the second dataflow gasket, the second dataflow gasket can program the input stream registers of the second dataflow gasket for an incoming read stream.

20 Claims, 10 Drawing Sheets

(56) References Cited

U.S. PATENT DOCUMENTS

| | | | |
|---|---|---|---|
| 6,678,722 B1* | 1/2004 | Kanoh | G06F 15/17331 709/212 |
| 7,058,728 B1* | 6/2006 | Eklund | H04L 69/04 455/445 |
| 2006/0206635 A1* | 9/2006 | Alexander | G06F 13/28 710/22 |
| 2012/0185614 A1 | 7/2012 | Reed | |
| 2014/0173161 A1* | 6/2014 | Dobbs | G06F 15/7817 710/306 |
| 2014/0211634 A1 | 7/2014 | Matthews et al. | |
| 2014/0369194 A1 | 12/2014 | Friedman et al. | |
| 2017/0171095 A1 | 6/2017 | Prasadh et al. | |
| 2019/0392020 A1 | 12/2019 | Balasubramaniyan et al. | |
| 2021/0318982 A1 | 10/2021 | Wei et al. | |
| 2022/0035760 A1 | 2/2022 | Lin et al. | |
| 2023/0135306 A1 | 5/2023 | Di Febbo et al. | |
| 2025/0036842 A1 | 1/2025 | Mayer et al. | |
| 2025/0181530 A1 | 6/2025 | Mayer et al. | |

FOREIGN PATENT DOCUMENTS

| | | |
|---|---|---|
| EP | 3 346 423 A1 | 7/2018 |
| JP | 2017-130930 A | 7/2017 |
| TW | 201234293 A | 8/2012 |
| TW | I528279 B | 4/2016 |

OTHER PUBLICATIONS

Office Action issued in Taiwanese Patent Application No. 113127622 dated Jul. 31, 2025 in 17 pages.

Notice of Allowance with Translation Issued in Taiwan Application No. 113127622 dated Oct. 31, 2025 in 3 pages.

* cited by examiner

DATAFLOW GASKETS FOR HANDLING DATA STREAMS

CROSS-REFERENCE TO RELATED APPLICATIONS

The present application claims priority to U.S. Provisional Patent Application No. 63/515,432, filed Jul. 25, 2023, and titled "DATAFLOW GASKETS FOR HANDLING DATA STREAMS," the entirety of which is hereby incorporated herein by reference.

FIELD OF THE DISCLOSURE

Embodiments of the invention relate to electronic systems, and more particularly to, dataflow gaskets for facilitating data movement among circuit blocks.

BACKGROUND

Various techniques can be used to move data between electronic circuits. For example, certain electronic systems use standard bussing for interconnecting circuit blocks for data movement. However, data traffic can be of many types (memory, peripheral, and/or computation) having varying characteristics. Thus, when standard bussing is designed for overall throughput, the bussing can stall at times while slower systems (i.e. off-chip memory) absorb high traffic periods.

In another example, point-to-point bussing can be used to connect each compute block to every other compute block. Point-to-point bussing can support any arbitrary data traffic between circuit blocks but can have unnecessary area and/or power overhead.

SUMMARY OF THE DISCLOSURE

Apparatus and methods for facilitating data movement among circuit blocks are disclosed. In certain embodiments, an integrated circuit (IC) includes a network of dataflow gaskets including a first dataflow gasket coupled to a first circuit block and a second dataflow gasket coupled to a second circuit block. The first circuit block can write to the second circuit block by programming output stream registers of the first dataflow gasket for an outgoing write stream that includes a header identifying the second dataflow gasket. The header can be provided by the first dataflow gasket to the second dataflow gasket over the network, and in response to the header reaching the second dataflow gasket, the second dataflow gasket can program the input stream registers of the second dataflow gasket for an incoming read stream. Thereafter, the first circuit block can provide write data to the second circuit block by way of the outgoing write stream of the first dataflow gasket and the incoming read stream of the second dataflow gasket.

In one aspect, an integrated circuit (IC) includes a plurality of circuit blocks including a first circuit block and a second circuit block, and a plurality of dataflow gaskets electrically connected by a network of gasket interconnect. The plurality of dataflow gaskets can include a first dataflow gasket comprising output stream registers and an output memory coupled to the first circuit block, and a second dataflow gasket comprising input stream registers and an input memory coupled to the second circuit block. The first circuit block can write data to the second circuit block by programming the output stream registers of the first dataflow gasket for an outgoing write stream that includes a header identifying the second dataflow gasket, and by the second dataflow gasket programming the input stream registers of the second dataflow gasket for an incoming read stream in response to the header reaching the second dataflow gasket over the network.

In another aspect, a method of dataflow in an IC is disclosed. The method can include initiating a write from a first circuit block of the IC to a second circuit block of the IC using the first circuit block and programming output stream registers of a first dataflow gasket of the IC for an outgoing write stream using the first circuit block, the first dataflow gasket including an output memory coupled to the first circuit block, and the outgoing write stream including a header identifying a second dataflow gasket of the IC that is electrically connected to the first dataflow gasket by a network of gasket interconnect. The method can further include programming input stream registers of the second dataflow gasket for an incoming read stream in response to the header reaching the second dataflow gasket over the network, the second dataflow gasket further including an input memory coupled to the second circuit block.

In another aspect, a network of dataflow gaskets can include a first dataflow gasket including output stream registers and an output memory configured to couple to a first circuit block. and a second dataflow gasket electrically connected to the first dataflow gasket by a network of gasket interconnect. The second dataflow gasket can include input stream registers and an input memory configured to couple to a second circuit block. The output stream registers of the first dataflow gasket can be programmable for an outgoing write stream that includes a header identifying the second dataflow gasket, and the input stream registers of the second dataflow gasket can be programmable for an incoming read stream in response to the header reaching the second dataflow gasket over the network.

DETAILED DESCRIPTION

Figure 1:
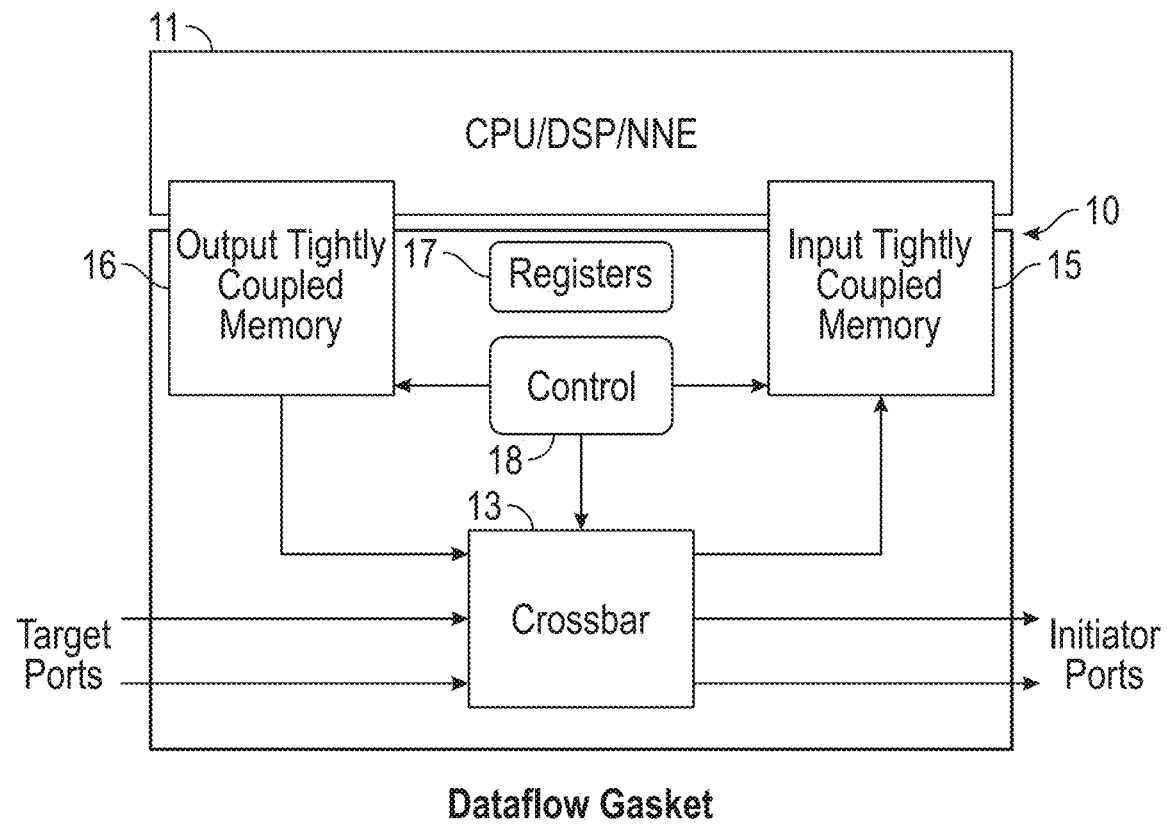
FIG. 1 is a schematic diagram of one embodiment of a dataflow gasket.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

As integrated circuit (IC) technology is scaled to smaller technology nodes, the transistor density (or number of transistors that can be integrated into a unit area of an IC) increases drastically. The increased density translates to heterogeneous complex chips in which multiple blocks with different architectures are combined into a single die to provide a System-on-Chip (SoC). For example, a single die can include a combination of central processing units (CPUs), digital signal processors (DSPs), and neural processing units (NPUs). An NPU is also referred to herein as a neural network engine (NNE).

On the other hand, in the past few years, neural networks such as convolution neural networks (CNNs), recurrent neural networks (RNNs), and multi-layer perception networks (MLPs) have been shown to outperform traditional DSP algorithms in many fields such as computer vision and speech recognition.

Accordingly, many current and future IC applications consist of DSP algorithms and neural network models. In these applications, while fast data converters (for example, high-speed analog-to-digital converters or ADCs) provide the data for processing, different parts of computational graphs are mapped onto different circuit blocks such as CPUs, DSPs and NPUs. Such mapping gives rise to significant data movement among different circuit blocks. Thus, data transfer between circuit blocks is key to achieving fast and efficient processing for these signal processing applications.

Certain ICs use standard bussing to build a network-on-chip (NoC) for interconnecting circuit blocks for data movement. However, a standard NoC has many types of traffic (memory, peripheral, and/or computation) having varying characteristics. Standard bussing is typically designed for overall throughput, and thus can stall at times while slower systems (i.e. off-chip memory) absorb high traffic periods.

In another example, point-to-point bussing can be used to connect each compute block to every other compute block. Point-to-point bussing can support any arbitrary data traffic between circuit blocks. However, in many domain-specific applications such as signal processing, only a handful of traffic patterns are generated during run time. Accordingly, such generality is not needed, but rather causes an inefficient usage of resources (transistors and wires) and leads to unnecessary area and/or power overhead. For example, point-to-point bussing is not scalable and requires exponentially more wires as the number of compute blocks increases.

Overview of Example Embodiments of Dataflow Gaskets

The following section provides an overview of example embodiments for dataflow gaskets. While certain embodiments have been described, these embodiments have been presented by way of example only and are not intended to limit the scope of the disclosure. Any suitable combination of features of the embodiments described can be combined to provide further embodiments.

Dataflow gaskets for handling data streams are disclosed herein. The dataflow gaskets can be deployed in any number or arrangement to achieve efficient on-chip data movement among different circuit blocks of the die. Each dataflow gasket can be attached to a corresponding circuit block using tightly coupled memories to provide low latency and fast access to incoming and outgoing data streams. Furthermore, memory allocation and buffer management can be handled by the internal logic in the dataflow gasket to reduce or eliminate software development efforts.

In certain embodiments, an IC includes a network of dataflow gaskets including a first dataflow gasket coupled to a first circuit block and a second dataflow gasket coupled to a second circuit block. The first circuit block can write to the second circuit block by programming output stream registers of the first dataflow gasket for an outgoing write stream that includes a header identifying the second dataflow gasket. The header can be provided by the first dataflow gasket to the second dataflow gasket over the network, and in response to the header reaching the second dataflow gasket, the second dataflow gasket can program the input stream registers of the second dataflow gasket for an incoming read stream. Thereafter, the first circuit block can provide write data to the second circuit block by way of the outgoing write stream of the first dataflow gasket and the incoming read stream of the second dataflow gasket.

By using dataflow gaskets in this manner, fast and efficient transfer of data is achieved without the first circuit block and the second circuit block needing to directly communicate with one another and/or understand each other's internal memory addressing.

In addition to being configurable for a write operation, the dataflow gaskets can perform other operations including, but not limited to, read, register write, register read, stream merge, and/or stream forking operations.

The dataflow gaskets can have networking capabilities in which dataflow gaskets can be networked using fast internal interconnects. The internal interconnect topology can be customizable based on the traffic patterns that exist in the computational graph of a particular signal processing application. Accordingly, an efficient usage of resources used for interconnects is provided.

Furthermore, the dataflow gaskets can be integrated into an IC alongside of traditional NoCs in different configurations. Thus, the IC can include a network of dataflow gaskets alongside other levels of bussing providing varying performance levels, such as different degrees of connectivity, throughput and/or latency.

Description of Embodiments of Dataflow Gaskets Shown in Figures

FIG. 1 is a schematic diagram of one embodiment of a dataflow gasket 10. The dataflow gasket 10 is depicted as being coupled to a circuit block 11, which can be, for example, a CPU, DSP, NNE, reconfigurable compute unit (for example, a field programmable gate array or FPGA), or other intellectual property (IP) circuit block. The dataflow gasket 10 includes a crossbar switch 13, an input memory 15, an output memory 16, registers 17, and a control circuit 18. The dataflow gasket 10 can be interconnected with other dataflow gasket(s) on-chip as part of a larger NoC. Thus, dataflow gaskets can be arranged on an IC to form a desired NoC suitable for a particular IC design or application. An IC is also referred to herein as a semiconductor die or chip.

In the illustrated embodiment, the crossbar switch 13 includes an input-side that is coupled to input ports (also referred to herein as target ports) and to the output memory 16. The input ports receive data packets from a network of dataflow gaskets. The crossbar switch 13 also includes an output-side that is coupled to output ports (also referred to herein as initiator ports) and to the input memory 15. The output ports provide data packets to other dataflow gasket(s) in the network. The crossbar switch 13 is controlled by the control circuit 18 to provide desired switch connectivity between the input side and the output side.

Accordingly, the crossbar switch 13 can provide desired connections between the input side and the output side to thereby route data into and out of the dataflow gasket 10. In a first example, data received on the input ports is routed by the crossbar switch 13 to the input memory 15. In a second example, data received on the input ports is routed by the crossbar switch 13 to the output ports. In a third example, data from the output memory 16 is routed by the crossbar switch 13 to the output ports.

With continuing reference to FIG. 1, the registers 17 (also referred to herein as a register file) are used to hold a variety of information, including, for example, gasket identification information for identifying the gasket within the network of dataflow gaskets, a routing table, input stream configuration for input stream(s), output stream configuration for output stream(s), and/or feature configuration data for controlling a variety of gasket features.

The input memory 15 receives data from the crossbar switch 13, and is tightly coupled to the circuit block 11. Additionally, the output memory 16 provides data to the crossbar switch 13 and is tightly coupled to the circuit block 11. Both the circuit block 11 and the dataflow gasket 10 have access to the input memory 15 and the output memory 16. In one example, the dataflow gasket 10 can write to the input memory 15 and read from the output memory 16, while the circuit block 11 can read from the input memory 15 and write to the output memory 16. However, other implementations are possible, such as configurations in which both the dataflow gasket 10 and the circuit block 11 can read and write to both the input memory 15 and the output memory 16.

In certain implementations, the input memory 15 and/or the output memory 16 are implemented with a circular buffer to facilitate memory allocation and dataflow. By using circular buffer(s), complexity in reading and writing over the memory interface between the circuit block 11 and the dataflow gasket 10 is reduced. Accordingly, during design of an IC, a desired architecture of circuit blocks (CPUs, DSPs, NNEs, reconfigurable compute units, and/or other IP blocks) can be placed and easily interconnected to one another by a network of dataflow gaskets with little to no design overhead.

Figure 2A:
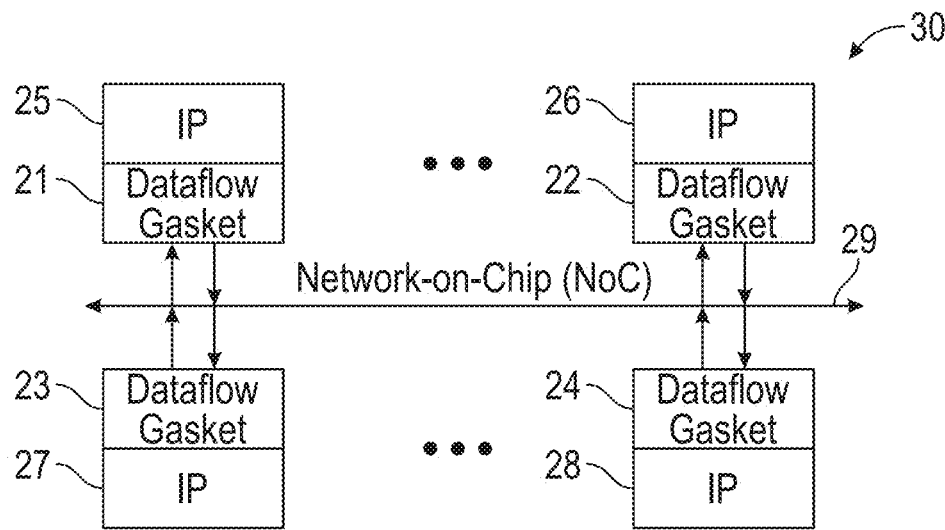
FIG. 2A is a schematic diagram of one embodiment of an integrated circuit (IC) including circuit blocks interconnected by dataflow gaskets.

FIG. 2A is a schematic diagram of a one embodiment of an IC 30 including circuit blocks interconnected by dataflow gaskets.

In the illustrated embodiment, the IC 30 includes a first dataflow gasket 21, a second dataflow gasket 22, a third dataflow gasket 23, a fourth dataflow gasket 24, a first circuit block 25, a second circuit block 26, a third circuit block 27, a fourth circuit block 28, and interconnect forming an NoC 29. Although four dataflow gaskets and four circuit blocks are depicted, more or fewer gaskets and circuit blocks can be included as indicated by the ellipsis.

As shown in FIG. 2A, the NoC 29 interconnects the dataflow gaskets 21-24 to one another. Additionally, the dataflow gaskets 21-24 are connected to the circuit blocks 25-28, respectively. The dataflow gaskets 21-24 and NoC 29 allow the efficient transfer of data between the depicted circuit blocks 25-28.

Although one arrangement of dataflow gaskets is shown, dataflow gaskets can be connected in a wide variety of ways. Indeed, dataflow gaskets serve as building blocks for data flow that allow for implementing the NoC 29 to achieve standard topologies (for instance, mesh or ring) as well as any custom topology.

Figure 2B:
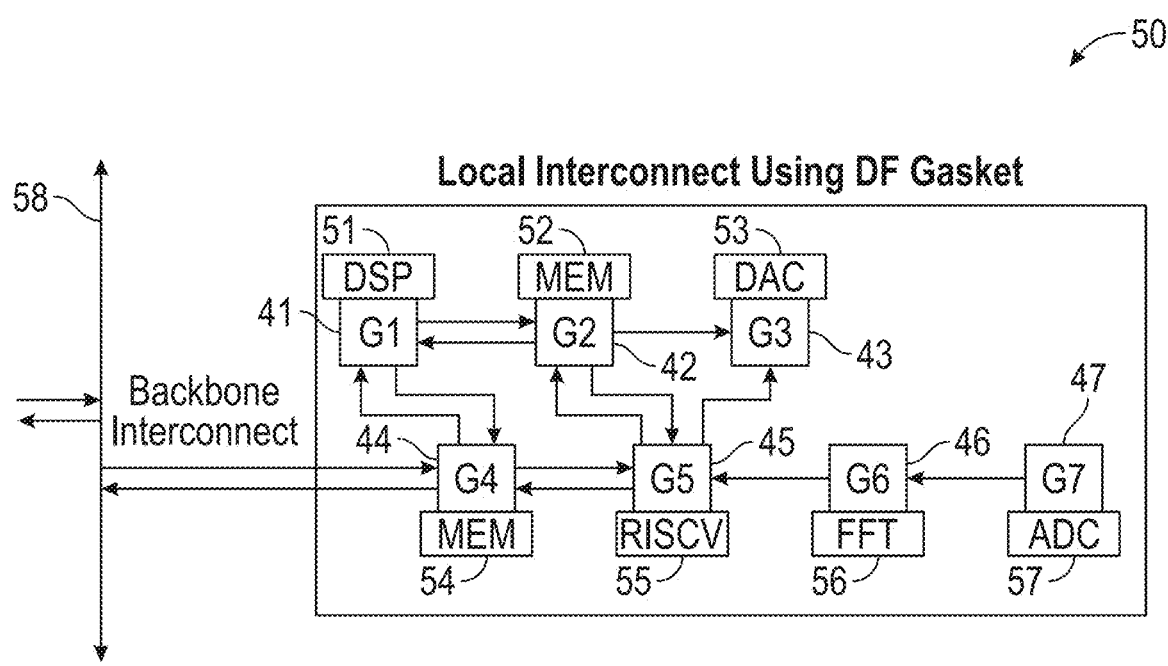
FIG. 2B is a schematic diagram of another embodiment of an IC including circuit blocks interconnected by dataflow gaskets.

FIG. 2B is a schematic diagram of another embodiment of an IC 50 including circuit blocks interconnected by dataflow gaskets.

In the illustrated embodiment, the IC 50 includes dataflow gaskets 41 (G1), 42 (G2), 43 (G3), 44 (G4), 45 (G5), 46 (G6), and 47 (G7). The dataflow gaskets 41-47 are interconnected with one another using an example custom interconnect topology. As shown in FIG. 2B by the directional arrows, a particular gasket can communicate with a subset of the other gasket(s). Such communication can be unidirectional (read or write only) or bidirectional (read and write).

The gaskets 41-47 are each connected to a particular circuit block, which are of varying types of IP blocks, in this embodiment. In particular, the IC 50 includes a DSP 51 coupled to the dataflow gasket 41, a memory 52 coupled to the dataflow gasket 42, a digital-to-analog converter (DAC) 53 coupled to the dataflow gasket 43, a memory 54 coupled to the dataflow gasket 44, a fifth generation reduced instruction set computer (RISCV or RISC-V) 55 coupled to the dataflow gasket 45, a fast Fourier transform (FFT) processor 56 coupled to the dataflow gasket 46, and an ADC 57 coupled to the dataflow gasket 47.

The IC 50 depicts one example application that can benefit from the use of dataflow gaskets to provide efficient transform of data between various circuit blocks. Although one example topology is shown, dataflow gaskets can be deployed in a wide variety of standard, semi-custom, or custom topologies to facilitate dataflow between any desired circuit blocks. Such dataflow can be further expanded by connection of one or more of the dataflow gaskets to backbone interconnect 58, thereby allowing connectivity to further components.

Figure 3:
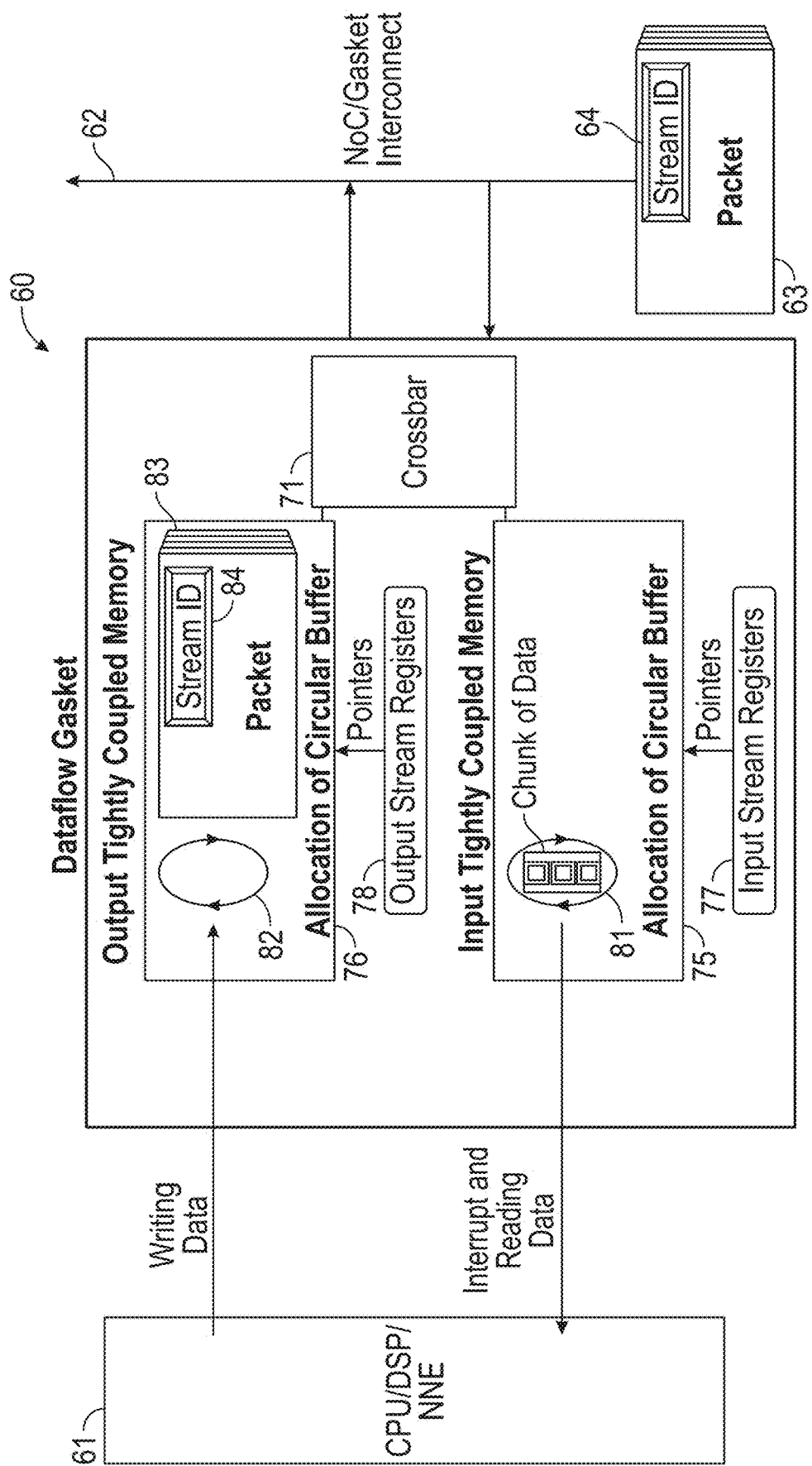
FIG. 3 is a schematic diagram of another embodiment a dataflow gasket.

FIG. 3 is a schematic diagram of another embodiment a dataflow gasket 60. The dataflow gasket 60 is depicted as being coupled to a circuit block 61, which can be, for example, a CPU, DSP, NNE, reconfigurable compute unit, or other IP circuit block such as any of those shown above with reference to FIG. 2B. The dataflow gasket 60 includes a crossbar switch 71, an input memory 75, an output memory 76, input stream registers 77, and output stream registers 78. Although not shown in FIG. 3, the dataflow gasket 60 can include additional functional and control circuitry, which has not been depicted in FIG. 3 for clarity of the figure.

As shown in FIG. 3, the crossbar switch 71 is connected to gasket interconnect 62 that is interconnected with other dataflow gasket(s) as part of an NoC. As shown in FIG. 3, the gasket interconnect 62 is used to send and receive data packets, such as the data packet 63, which has a stream identification (ID) 64.

With continuing reference to FIG. 3, the input memory 75 is tightly coupled to the circuit block 61. Such tight coupling can be achieved in any suitable manner, including, but not limited to, using a custom or non-custom memory interface with a fixed latency read path.

In one example, a two-cycle pipelined bus performs a read operation by broadcasting a read transaction request on a first cycle, and returning data on a second cycle, in which the second cycle can contain another transaction request. The latency is substantially fixed between the read request and the delivery of the data. For instance, an Advanced High-performance Bus (AHB) can operate in this manner to provide tight coupling and enable one transfer per cycle.

As shown in FIG. 3, data received from the gasket interconnect 62 can be provided from the crossbar switch 71 for writing to the input memory 75. Such writing can be facilitated by the use of the input stream registers 77. The input memory 75 includes a circular buffer 81, which is used by the circuit block 61 for reading data from the input memory 75. The circular buffer 81 simplifies memory addressing for the circuit block 61, thereby providing a memory interface between the circuit block 61 and the dataflow gasket 60 that avoids a need for the circuit block 61 to understand the internal memory addressing of the input memory 75. As shown in FIG. 3, the circular buffer 81 also selectively activates an interrupt signal to alert the circuit block 61 as to when new data is available for reading.

In the illustrated embodiment, the output memory 76 is tightly coupled to the circuit block 61, which can write data to the output memory 76. Additionally, the output memory 76 can provide data in the form of data packets (for example, data packet 83 with stream ID 84) to the gasket interconnect 62 by way of the crossbar switch 71. The output of data from the output memory 76 can be facilitated by the use of the output stream registers 78. The output memory 76 includes a circular buffer 82, which is used by the circuit block 62 for writing data to the output memory 76. The circular buffer 82 simplifies memory addressing for the circuit block 61, thereby providing a memory interface between the circuit block 61 and the dataflow gasket 60 that avoids a need for the circuit block 61 to understand the internal memory addressing of the output memory 76.

With general reference to FIGS. 4A-6B, a network of interconnected dataflow gaskets enables communication of data stream traffic between circuit blocks. For example, each dataflow gaskets is connected to an associated circuit block using tightly coupled input and output memories, while the network of dataflow gaskets can perform operations including, but not limited to, write, read, register write, register read, stream merge, and/or stream forking operations. Such traffic can include a stream originating from a connected gasket that is directed to another gasket. When in route, the stream can pass through intervening gaskets until reaching the destination.

In certain implementations, when initially establishing a stream, a destination dataflow gasket can send an error response to a source dataflow gasket when the destination dataflow gasket has insufficient resources available to handle the request. Additionally, the source dataflow gasket can wait for an okay response on start of the header transaction before sending the rest of the data stream. Additionally or alternatively, a destination dataflow gasket can stall a data transfer when running low on resources.

Figure 4A:
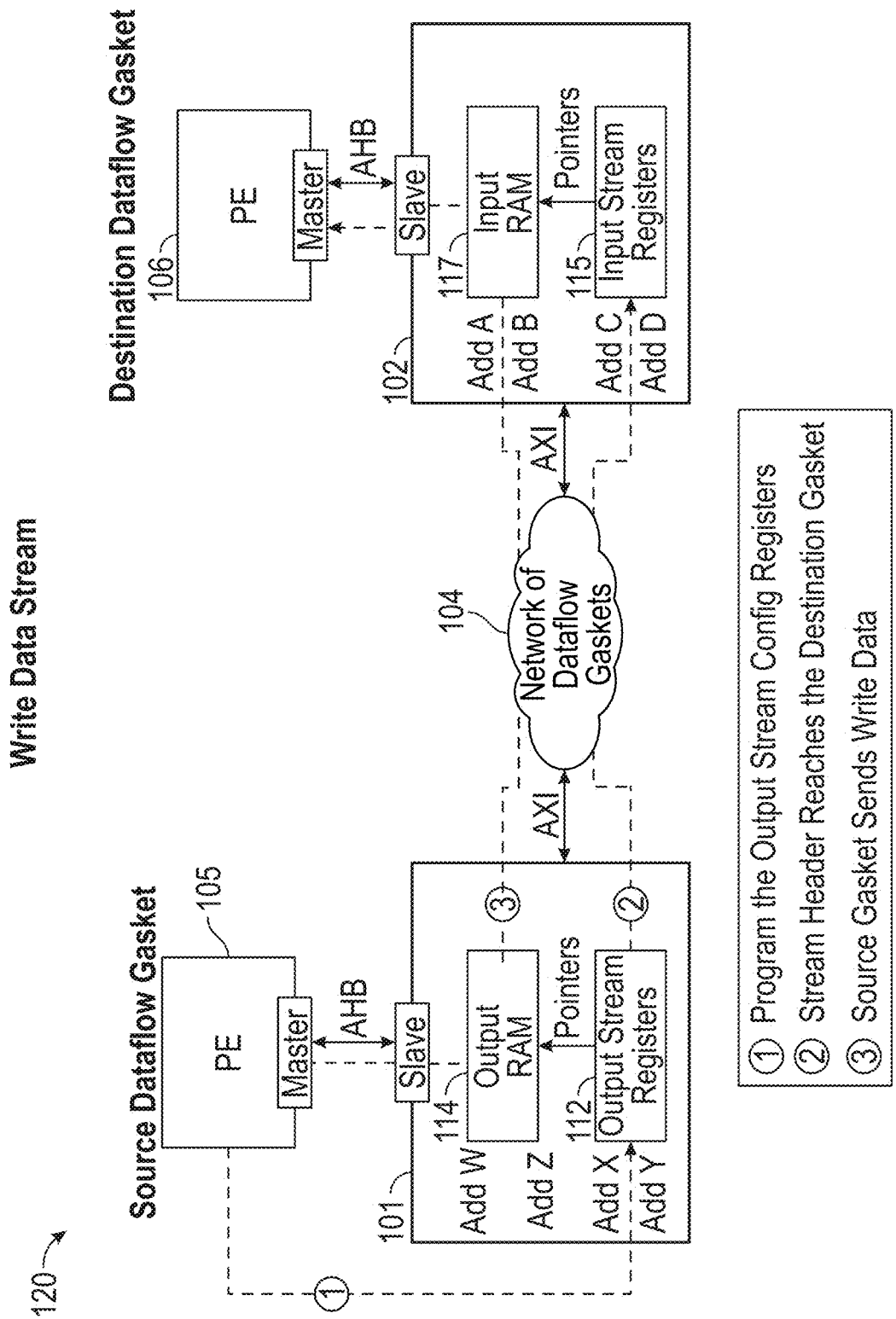
FIG. 4A is a schematic diagram of one embodiment of a write data stream using dataflow gaskets.

FIG. 4A is a schematic diagram of one embodiment of a write data stream 120 using dataflow gaskets. As shown in FIG. 4A, a source processing element (PE) or first circuit block 105 is connected to a first dataflow gasket 101, and a destination processing element or second circuit block 106 is connected to a second dataflow gasket 102. Additionally, the first dataflow gasket 101 and the second dataflow gasket 102 are connected to one another over gasket interconnect or NoC 104, which can include any number of dataflow gaskets.

To perform a write operation between the first circuit block 105 and the second circuit block 106, the first circuit block 105 programs output stream configuration registers 112 in the first dataflow gasket 101 to setup an outgoing write stream. The outgoing write stream identifies (by way of a header) the second dataflow gasket 102 as a destination. Additionally, the outgoing write stream can be provided from the output memory 114 of the first dataflow gasket 101 to the NoC 104.

When the stream header reaches the second dataflow gasket 102, the second dataflow gasket 102 uses the header data to program the input stream configuration registers 115 if the second dataflow gasket 102 to setup an incoming data stream. The incoming data stream is received by an input memory 117 of the second dataflow gasket 102 from the NoC 104. Additionally, as data is received at the second dataflow gasket 102, the second dataflow gasket 102 can interrupt the second circuit block 106 as desired to inform the second circuit block 106 of the arrival of data.

Figure 4B:
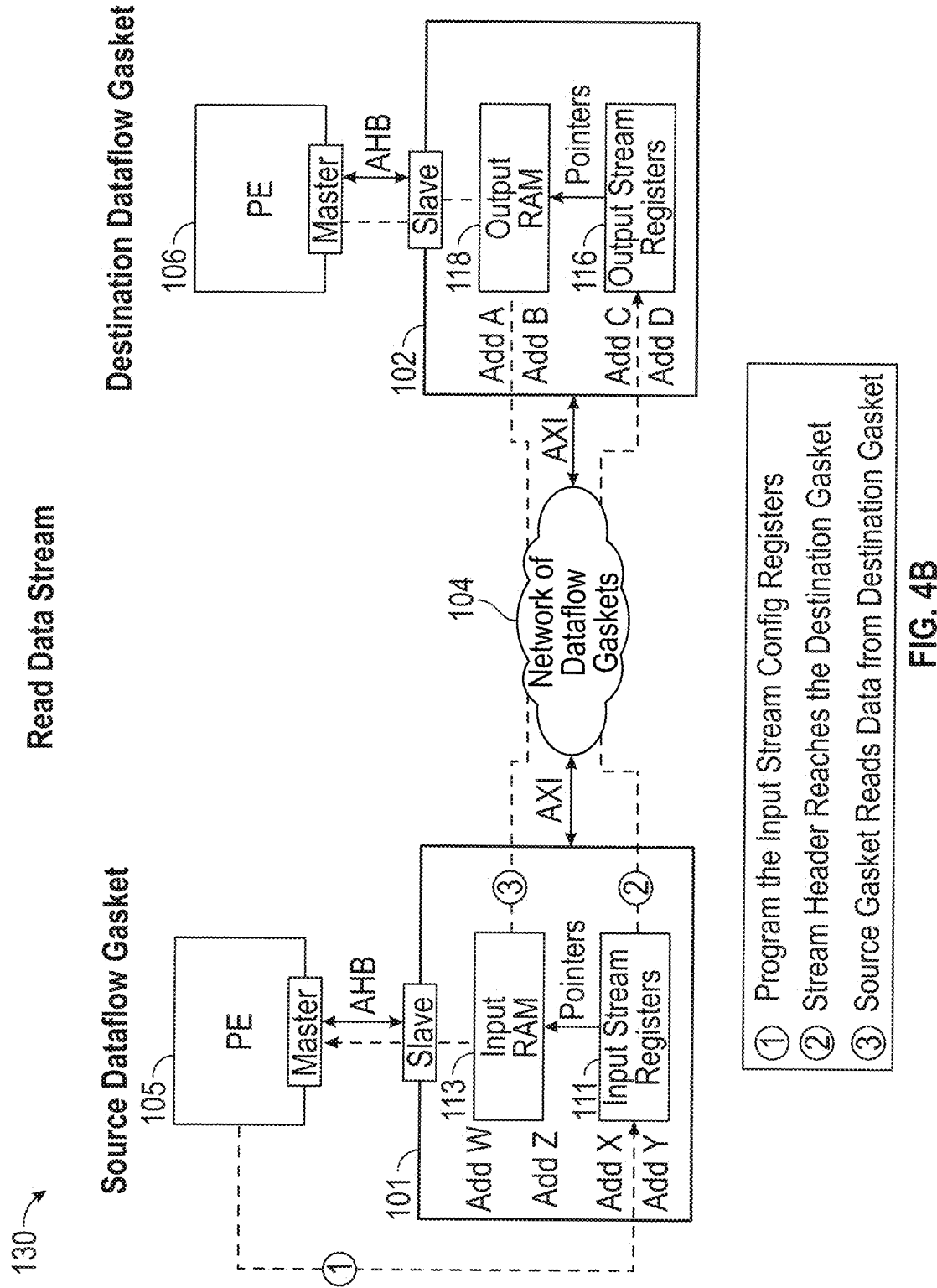
FIG. 4B is a schematic diagram of one embodiment of a read data stream using dataflow gaskets.

FIG. 4B is a schematic diagram of one embodiment of a read data stream 130 using dataflow gaskets. As shown in FIG. 4B, a first circuit block 105 is connected to a first dataflow gasket 101, and a second circuit block 106 is connected to a second dataflow gasket 102. Additionally, the first dataflow gasket 101 and the second dataflow gasket 102 are connected to one another over NoC 104.

To perform a read operation of the second circuit block 106 initiated by the first circuit block 105, the first circuit block 105 can program input stream configuration registers 111 in the first dataflow gasket 101 to set an incoming read stream. Additionally, the first dataflow gasket 101 can send a stream over the NoC 104 with a header identifying the second dataflow gasket 102 as a destination. When the stream header reaches the second dataflow gasket 102, the second dataflow gasket 102 can use the header data to program the output stream configuration registers 116 of the second dataflow gasket 102 to setup an outgoing data stream. The first dataflow gasket 101 thereafter initiates reads to the second dataflow gasket 102, which returns data from the second dataflow gasket's output memory 118 using a circular buffer. The returned data is received by an input memory 113 of the first dataflow gasket 101, which can interrupt the first circuit block 105 as desired to inform the first circuit block 105 of the arrival of data.

Thus, in certain implementations, a read stream can be implemented by setting a write stream in a reverse direction.

In the illustrated embodiment, the second circuit block 106 connected to the destination gasket 102 is aware of the output stream and the data needed to be sent.

With reference to FIGS. 4A and 4B, a source dataflow gasket can be used to set up one data stream, while a destination dataflow gasket sets up one corresponding stream or multiple data streams in the case of merging. In such implementations, circular buffers can be used for both the source dataflow gasket and the destination dataflow gasket.

Figure 5A:
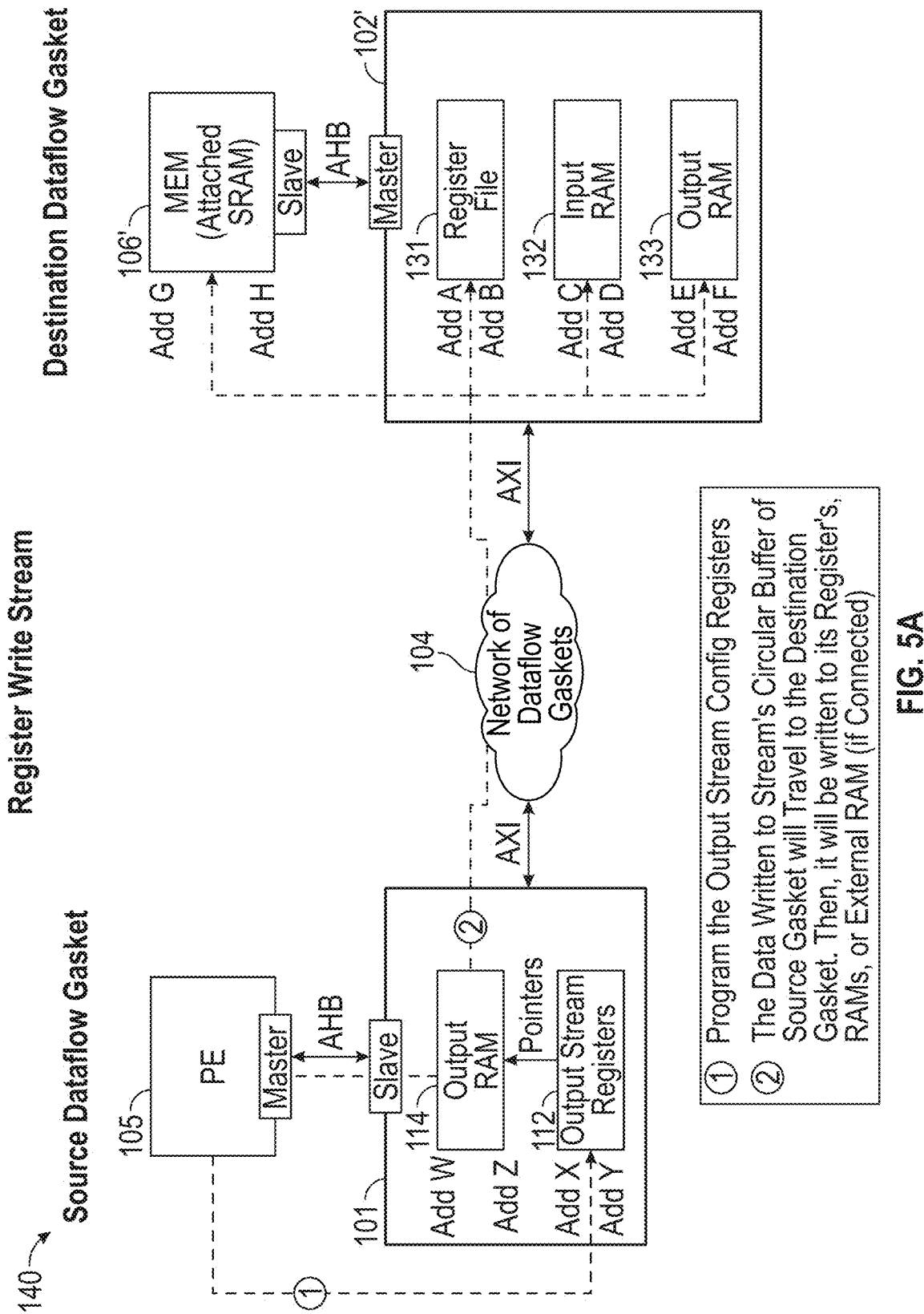
FIG. 5A is a schematic diagram of one embodiment of a register write stream using dataflow gaskets.

FIG. 5A is a schematic diagram of one embodiment of a register write stream 140 using dataflow gaskets. As shown in FIG. 5A, a first circuit block 105 is connected to a first dataflow gasket 101, and a second circuit block 106' is connected to a second dataflow gasket 102'. The second circuit block 106' is depicted as an attached memory (MEM), such as an attached static random-access memory (SRAM). However, in other implementations the second circuit block 106' can correspond to a processing element. The first dataflow gasket 101 and the second dataflow gasket 102' are connected to one another over NoC 104.

A register write stream can be used to program any register in any dataflow gasket on the NoC 104. For example, the first circuit block 105 can setup a register write stream by programming the output stream configuration registers 112 of the first dataflow gasket 101 that is connected to the first circuit block 105.

The data written to the first dataflow gasket's circular buffer travels from the output memory 114 of the first dataflow gasket 101 to the second dataflow gasket 102', where the data is written to the second dataflow gasket's registers. In certain implementations, a register write stream uses an AXI write channel.

In the illustrated embodiment, the second dataflow gasket 102' has its own address space that includes multiple regions. The multiple regions include a register file 131 (with addresses ranging from Add A to Add B), an input random access memory (RAM) 132 (with addresses ranging from Add C to Add D), an output RAM 133 (with addresses ranging from Add E to Add F), and the attached memory 106' (with addresses ranging from Add G to Add H).

The address space of the second dataflow gasket 102' need not be connected to the address space of the PE 105 in any manner. Rather, the PE 105 can read or write data to the first dataflow gasket 101 directly and/or by way of circular buffers (implemented using the output RAM 114), and thereafter the data transfer is stream based. Thus, the dataflow gaskets connect to each other using their own gasket interconnect/NOC, and provide a mechanism to connect different subsystems without being part of any PE's address space.

Figure 5B:
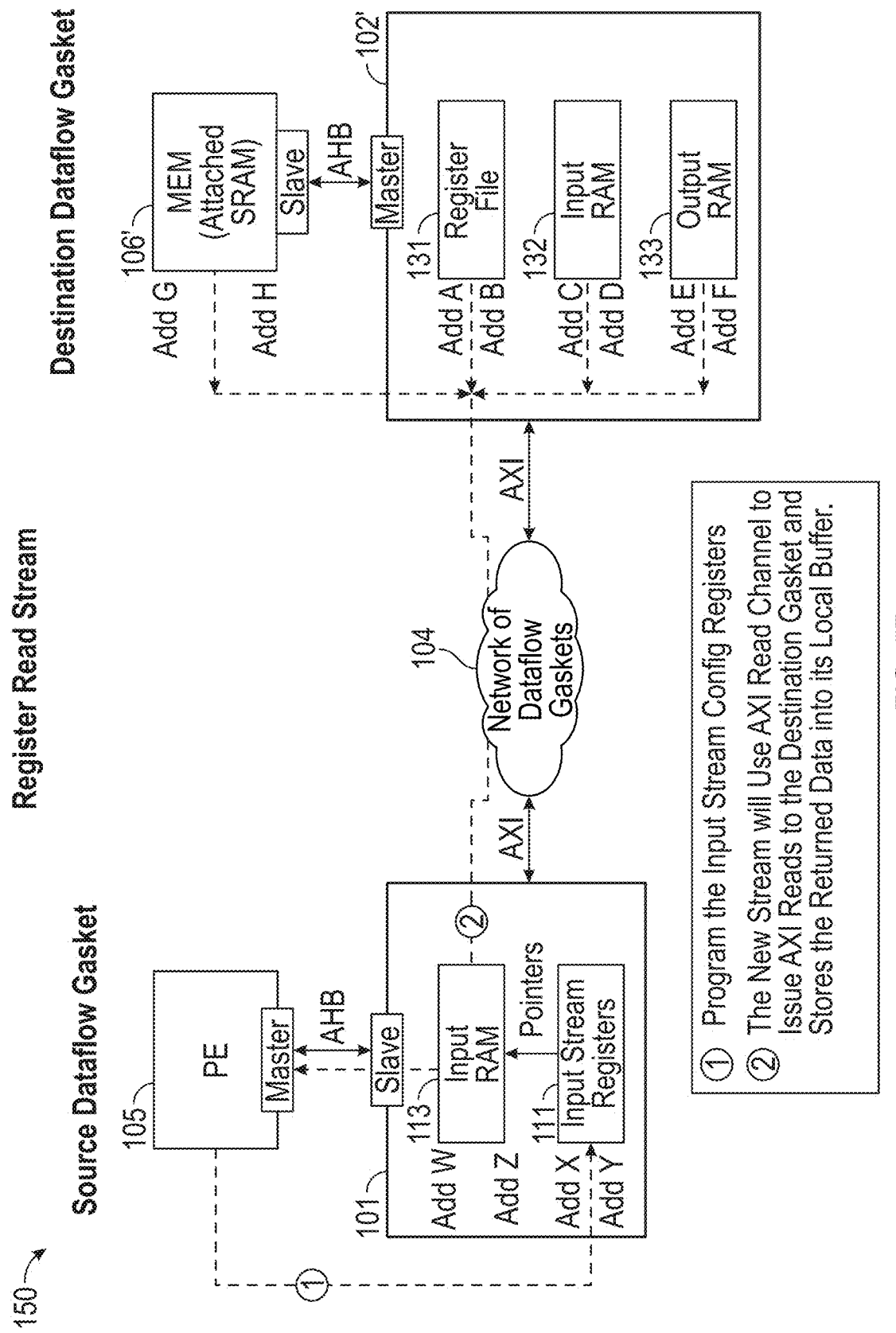
FIG. 5B is a schematic diagram of one embodiment of a register read stream using dataflow gaskets.

FIG. 5B is a schematic diagram of one embodiment of a register read stream 150 using dataflow gaskets. As shown in FIG. 5B, a first circuit block 105 is connected to a first dataflow gasket 101, and a second circuit block 106' is connected to a second dataflow gasket 102'. The second circuit block 106' is depicted as an attached memory, but can be a processing element in other implementations. The first dataflow gasket 101 and the second dataflow gasket 102' are connected to one another over NoC 104.

A register read stream can be used to read any register in any dataflow gasket on the NoC 104. For example, the first circuit block 105 can setup a register read stream by programming input stream configuration registers 111, which in certain implementations use an AXI read channel. For example, the first dataflow gasket 101 can issue AXI reads to the destination dataflow gasket 102 and store the returned data into the input memory 113. After the requested data is received, an interrupt can be sent to the processing element 105.

With reference to FIGS. 5A and 5B, a source dataflow gasket can be used to set up one data stream, while a destination dataflow gasket need not set up a corresponding stream since register streams can access all the resources mapped to the local address space of the gasket. For example, such local address space can include registers, local input and output memories, and/or external RAM connected to the gasket by way of an AHB port or other suitable interface. Thus, for register streams, circular buffers can be used by the source dataflow gasket but need not be used by the destination dataflow gasket.

Figure 6A:
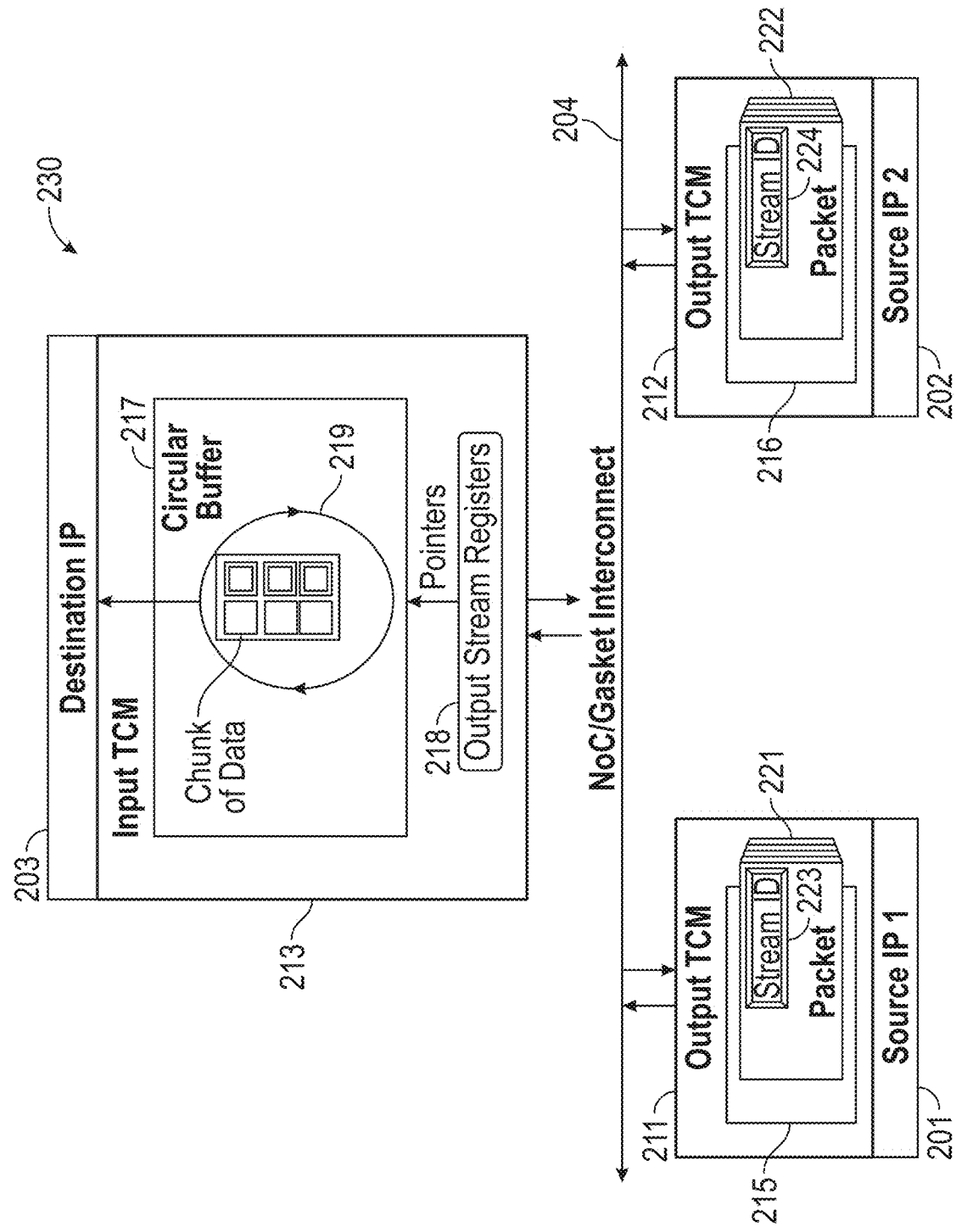
FIG. 6A is a schematic diagram of one embodiment of data stream merging using dataflow gaskets.

FIG. 6A is a schematic diagram of one embodiment of data stream merging 230 using dataflow gaskets. As shown in FIG. 6A, a first source IP circuit block 201 is connected to a first dataflow gasket 211, a second source IP circuit block 202 is connected to a second dataflow gasket 212, and a destination IP circuit block 203 is connected to a third dataflow gasket 213. Additionally, the first dataflow gasket 211, the second dataflow gasket 212, and the third dataflow gasket 213 are connected to one another by gasket interconnect or NoC 204.

In the illustrated embodiment, the first source IP circuit block 201 and the second source IP circuit block 202 each send data that is merged by the destination IP circuit block 213.

For example, as shown in FIG. 6A, first data from the first source IP circuit block 201 is provided to the output tightly coupled memory (TCM) 215 of the first dataflow gasket 211. The output TCM 215 converts the data to packets (for example, packet 221 with stream ID 223), which are sent by the first dataflow gasket 211 to the third dataflow gasket 213 over the gasket interconnect 204. Additionally, second data from the second source IP circuit block 202 is provided to the output TCM 216 of the second dataflow gasket 212. The output TCM 216 converts the data to packets (for example, packet 222 with stream ID 224), which are sent by the second dataflow gasket 212 to the third dataflow gasket 213 over the gasket interconnect 204.

The third dataflow gasket 213 receives the packets 221/222, which can be identified by the third dataflow gasket 213 as being directed to the third dataflow gasket 213 by way of the stream IDs 223/224. The third dataflow gasket 213 merges the first data and the second data into merged data that is stored in an input TCM 217 of the third dataflow gasket 213. Pointers from the output stream registers 218 are used to direct storage of the received data packets 221/222 into a circular buffer 219 of the input TCM 217.

The merged data is readable by the destination IP circuit block 203. Additionally, the data is readable without the destination IP circuit block 203 needing to have an understanding of how the data was merged and/or is stored within the dataflow gasket 213 to which it is coupled.

Figure 6B:
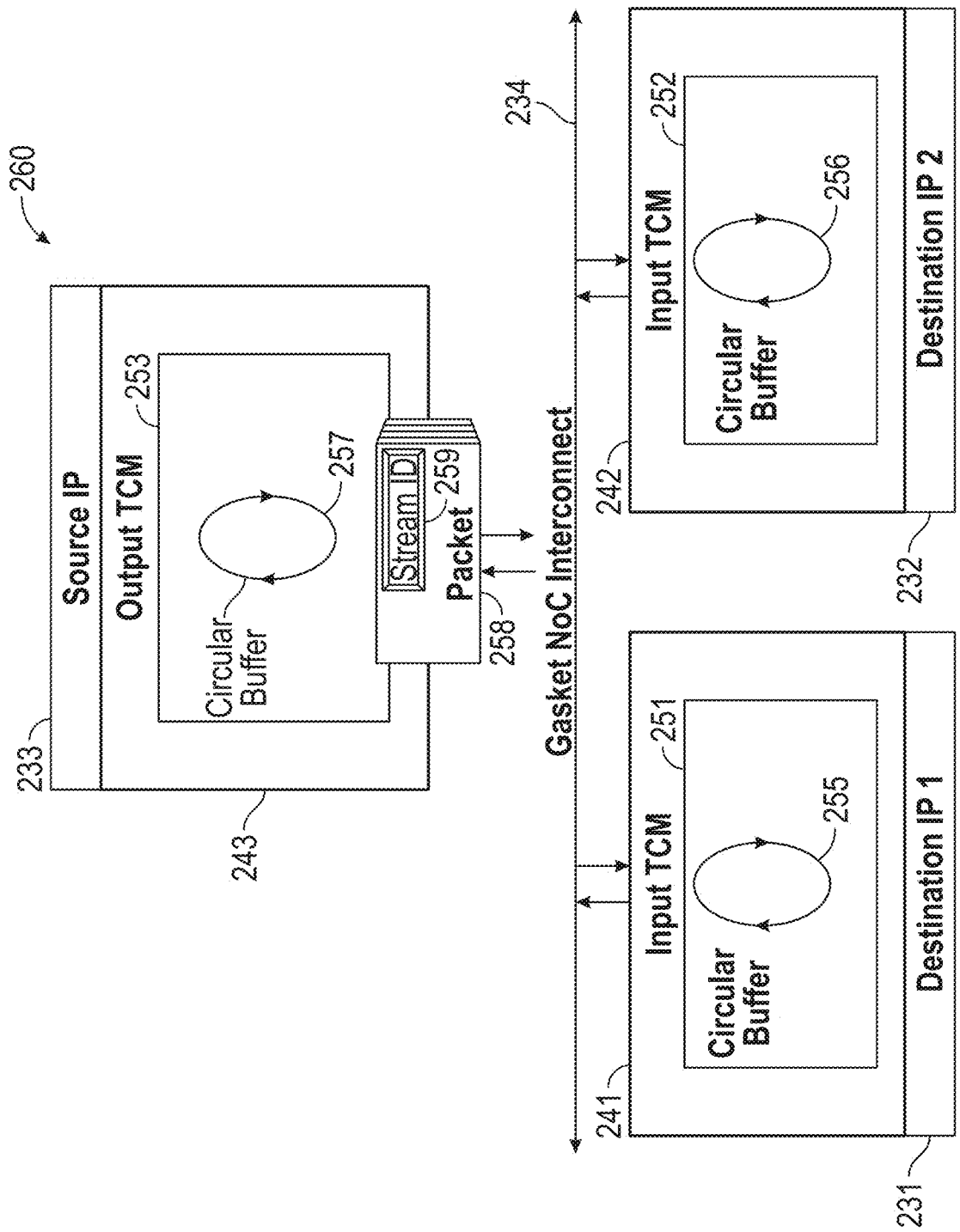
FIG. 6B is a schematic diagram of one embodiment of data stream forking using dataflow gaskets.

FIG. 6B is a schematic diagram of one embodiment of data stream forking using dataflow gaskets. As shown in FIG. 6B, a first destination IP circuit block 231 is connected to a first dataflow gasket 241, a second destination IP circuit block 232 is connected to a second dataflow gasket 242, and a source IP circuit block 233 is connected to a third dataflow gasket 243. Additionally, the first dataflow gasket 241, the second dataflow gasket 242, and the third dataflow gasket 243 are connected to one another by gasket interconnect or NoC 234.

In the illustrated embodiment, the source IP circuit block 233 outputs a data stream that is forked into a first data stream received by the first destination IP circuit block 231 and a second data stream received by the second destination IP circuit block 232. In certain implementations, the first data stream and the second data stream carry identical data content but have different headers.

As shown in FIG. 6B, a data stream from the source IP circuit block 233 is provided to the output TCM 253 of the third dataflow gasket 243. The output TCM 253 includes a circular buffer 257 that cases complexities in addressing with respect to the source IP circuit block 233 writing data to the output TCM 253. The output TCM 253 converts the data to packets (for example, packet 258 with stream ID 259), which are sent by the third dataflow gasket 243 to the first dataflow gasket 241 and/or the second dataflow gasket 242 over the gasket interconnect 204. By controlling the stream ID 259, all or a portion of the data stream can be directed to the first dataflow gasket 241 and/or the second dataflow gasket 242 (and thus to the first destination IP circuit block 231 and/or the second destination IP circuit block 232) as appropriate.

As shown in FIG. 6B, the first dataflow gasket 241 includes an input TCM 251 for storing all or a portion of the data stream from data packets that are directed to the first dataflow gasket 241. The input TCM 251 includes a circular buffer 255, which allows the first destination IP circuit block 231 to access that data without needing to understand how the data was received and/or stored within the input TCM 251. Likewise, the second dataflow gasket 242 includes an input TCM 252 for storing all or a portion of the data stream from data packets that are directed to the second dataflow gasket 242. The input TCM 252 includes a circular buffer 256, which allows the second destination IP circuit block 232 to access stored data within the input TCM 252.

Figure 7:
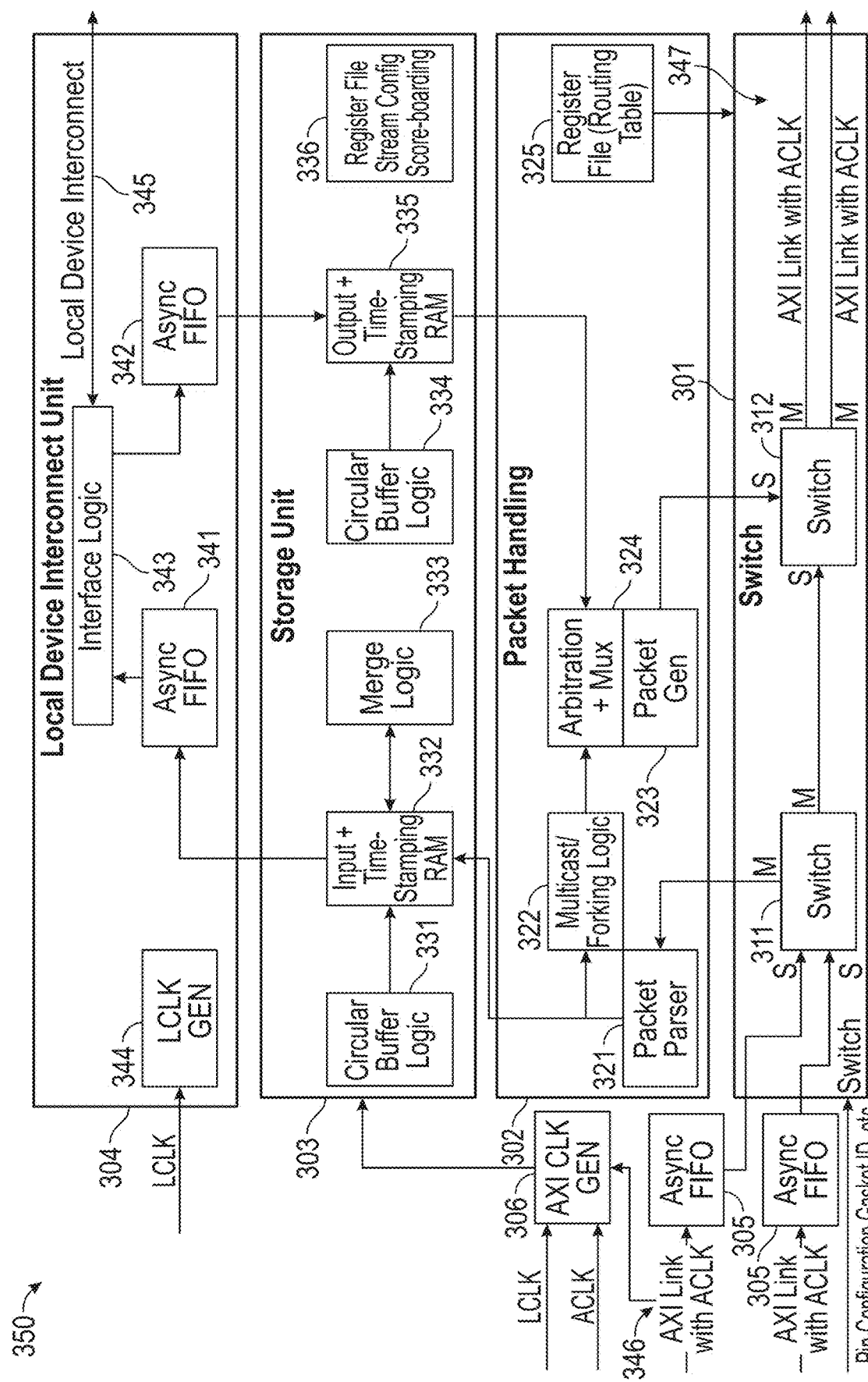
FIG. 7 is a schematic diagram of another embodiment of a dataflow gasket.

FIG. 7 is a schematic diagram of another embodiment of a dataflow gasket 350. The dataflow gasket 350 includes a crossbar switch 301, a packing handling circuit 302, a memory circuit 303 (also referred to as a storage unit), a local device interconnect circuit 304, asynchronous first-in first-out (FIFO) circuitry 305, and a clock generation circuit 306. The dataflow gasket 350 connects to an IP circuit block by way of local device interconnect 345, and connects to gasket interconnect/NoC by way of input ports 346 and output ports 347.

In the illustrated embodiment, the crossbar switch 311 includes an input-side switch 311 and an output-side switch 312. Additionally, the packet handling circuit 302 includes a packet parser 321, multicast/forking logic 322, a packet generation circuit 323, an arbitration and muxing circuit 324, and a register file 325 providing a routing table. Furthermore, the memory circuit 303 includes input circular buffer logic 331, input and time-stamping RAM 332, merge logic 333, output circular buffer logic 334, output and time-stamping RAM 335, and a register file 336 providing stream configuration and score boarding. Additionally, the local device interconnect unit 304 includes a local clock generation circuit 344, an input asynchronous FIFO 341, an output asynchronous FIFO 342, and interface logic 343.

With continuing reference to FIG. 7, the data path of the dataflow gasket 350 generally includes two major sub-blocks including a routing unit and a stream unit. The routing unit can be sub-divided into the packing handling circuit 302 and the crossbar switch 301. Additionally, the stream unit can be subdivided into the storage unit 303 and the local device interconnect unit 304.

The crossbar switch 301 connects to the crossbar switches of other dataflow gaskets by way of gasket interconnect/NoC. In the illustrated embodiment, the dataflow gasket 350 communicates with other dataflow gaskets by way of a multi-cycle bus, which can have unfixed latency in some implementations.

In one example, the multi-cycle bus can correspond to an N-cycle bus that can perform component transactions (read address, write address, read data, write data, and write acknowledge) with arbitrary pipelining. An N-cycle bus allows one transfer per cycle, but operates with latency that is not fixed. For instance, an Advanced Extensible Interface (AXI) can operate in this manner.

In another example, a two cycle un-pipelined bus performs a read operation by broadcasting a read transaction request on a first cycle and returning data on a second cycle, in which the second cycle does not contain another transaction request. For instance, an Advanced Peripheral Bus (APB) can operate in this manner. Although various examples of bus architectures for gasket interconnect are provided, other implementations are possible.

As shown in FIG. 7, the dataflow gasket 350 includes various register files. Such register files can be used to store routing unit information such as gasket ID and routing table. Additionally, the register files can include output stream configuration registers for running a desired number of output streams, and input stream configuration registers for running a desired number of input streams. Furthermore, the register files can include configuration registers used for enabling or disabling gasket features, such as those related to buffer allocation.

The input-side switch 311 serves to route incoming data through to the output-side switch 312 and/or to the storage unit 303 (by way of the packet parser 321). The input-side switch 311 can provide a stream ID to the packet parser 321, which can determine whether or not a particular received data packet is intended for the dataflow gasket 350. The output-side switch 312 can provide data coming through from the input-side switch 311 or data from the packet generation circuit 323 to the output ports 347.

With continuing reference to FIG. 7, the multicast/forking logic 322 can work in combination with the arbitration/multiplexing circuit 324 to facilitate broadcast of a packet to multiple dataflow gaskets. For example, a source dataflow gasket can send a list of all receiving dataflow gaskets as part of a packet. Once received at a given dataflow gasket, the dataflow gasket can send a list of all recipients of the stream as part of the packet and remove its own ID from the header.

The input and timing stamping RAM 332 serves to store incoming data. In this example, timestamp access for a FIFO mode is provided. Such a FIFO mode can increment a write pointer for writes and a read pointer for reads. The pointers correspond to addresses to the RAM's and point to a particular location inside the circular buffer of a stream. Thus, working in combination with the circular buffer logic 331, the input and timing stamping RAM 332 implements a circular buffer.

In the illustrated embodiment, merge logic 333 is included to facilitate a merge of data streams from multiple sources. For example, the merge logic 333 can facilitate the merge operation discussed earlier with respect to FIG. 6A.

The output and timing stamping RAM 335 serves to store outgoing data. Working in combination with the circular buffer logic 334, the output and timing stamping RAM 335 implements a circular buffer.

The storage unit 303 can operate with a first clock signal from the AXI clock generation circuit 306, while the local device interconnect unit 304 can operate with a second clock signal from the local clock generation circuit 344. The first and second clock signals can be asynchronous.

Accordingly, the input asynchronous FIFO 341 and the output asynchronous FIFO 342 are included and controlled by the interface logic 343. The asynchronous FIFOs 341/342 aid in communicating data between the storage unit 303 and an IP circuit block coupled to the dataflow gasket 350 by way of the local device interconnect 345.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. An integrated circuit (IC) comprising:
    a plurality of circuit blocks including a first circuit block and a second circuit block; and
    a plurality of dataflow gaskets electrically connected by a network of gasket interconnect, the plurality of dataflow gaskets comprising a first dataflow gasket comprising input stream registers, an input memory coupled to the first circuit block, output stream registers and an output memory coupled to the first circuit block, and a second dataflow gasket comprising output stream registers, an output memory coupled to the second circuit block, input stream registers and an input memory coupled to the second circuit block,
    wherein the first circuit block is configured to write data to the second circuit block by programming the output stream registers of the first dataflow gasket for an outgoing write stream that includes a header identifying the second dataflow gasket, and by the second dataflow gasket programming the input stream registers of the second dataflow gasket for an incoming read stream in response to the header reaching the second dataflow gasket over the network,
    wherein the first circuit block is configured to read from the second circuit block by programming the input stream registers of the first dataflow gasket for an incoming read stream, and by the second dataflow gasket programming the output stream registers of the second dataflow gasket for an outgoing write stream.

2. The IC of claim 1, wherein the data flows through the network from the output memory of the first dataflow gasket to the input memory of the second dataflow gasket.

3. The IC of claim 2, wherein the input memory of the second dataflow gasket is configured to activate an interrupt signal for the second circuit block in response to receiving the data.

4. The IC of claim 2, wherein the first circuit block writes the data to the output memory of the first dataflow gasket using a circular buffer of the first dataflow gasket.

5. The IC of claim 1, wherein an address space of the first circuit block is separate from an address space of the first dataflow gasket and an address space of the second dataflow gasket.

6. The IC of claim 1, wherein the first circuit block comprises a digital signal processor, a central processing unit, a neural processing unit, a reconfigurable compute unit, a digital-to-analog converter (DAC), or an analog-to-digital converter (ADC).

7. The IC of claim 1, wherein the plurality of dataflow gaskets further comprises a third dataflow gasket, wherein the data is configured to pass through the third dataflow gasket in route from the first dataflow gasket to the second dataflow gasket.

8. The IC of claim 1, wherein the first dataflow gasket comprises a first crossbar switch connected to the network, and the second dataflow gasket comprises a second crossbar switch connected to the network.

9. The IC of claim 1, wherein the input memory is readable by the second circuit block and the output memory is writable by the first circuit block.

10. The IC of claim 1, wherein the second dataflow gasket includes an input port connected to the network, and a crossbar switch configured to connect the input port to the input memory in response to the header reaching the second dataflow gasket.

11. The IC of claim 10, wherein the second dataflow gasket further includes an output port connected to the network, wherein the crossbar switch is further configured to connect the output memory to the output port to send the outgoing write stream, and to connect the input port to the output port for a data stream that does not identify the second dataflow gasket.

12. The IC of claim 1, wherein the second dataflow gasket is further configured to fork a received data stream into a first data stream for a first destination and a second data stream for a second destination.

13. The IC of claim 1, wherein the second dataflow gasket is further configured to merge a first data stream from a first source and a second data stream from a second source.

14. An integrated circuit (IC) comprising: The IC of claim 1,
    a plurality of circuit blocks including a first circuit block and a second circuit block; and
    a plurality of dataflow gaskets electrically connected by a network of gasket interconnect, the plurality of dataflow gaskets comprising a first dataflow gasket comprising output stream registers and an output memory coupled to the first circuit block, and a second dataflow gasket comprising input stream registers and an input memory coupled to the second circuit block,
    wherein the first circuit block is configured to write data to the second circuit block by programming the output stream registers of the first dataflow gasket for an outgoing write stream that includes a header identifying the second dataflow gasket, and by the second dataflow gasket programming the input stream registers of the second dataflow gasket for an incoming read stream in response to the header reaching the second dataflow gasket over the network
    wherein the second dataflow gasket further comprises a register file storing a gasket identifier, and a packet handling circuit configured to compare the header to the gasket identifier.

15. A method of dataflow in an integrated circuit (IC), the method comprising:
    initiating a write from a first circuit block of the IC to a second circuit block of the IC using the first circuit block;
    programming output stream registers of a first dataflow gasket of the IC for an outgoing write stream using the first circuit block, the first dataflow gasket including an output memory coupled to the first circuit block, and the outgoing write stream including a header identifying a second dataflow gasket of the IC that is electrically connected to the first dataflow gasket by a network of gasket interconnect;

programming input stream registers of the second dataflow gasket for an incoming read stream in response to the header reaching the second dataflow gasket over the network, the second dataflow gasket further comprising an input memory coupled to the second circuit block; and initiating a read of the second circuit block from the first circuit block by programming input stream registers of the first dataflow gasket for an incoming read stream, and by programming output stream registers of the second dataflow gasket for an outgoing write stream.

16. The method of claim 15, further comprising providing the data through the network from the output memory of the first dataflow gasket to the input memory of the second dataflow gasket.

17. The method of claim 16, further comprising writing the data from the first circuit block to the output memory of the first dataflow gasket using a circular buffer of the first dataflow gasket.

18. The method of claim 15, wherein the second dataflow gasket further comprises a register file storing a gasket identifier, the method further comprising comparing the header to the gasket identifier using a packet handling circuit of the second dataflow gasket.

19. The method of claim 15, further comprising feeding the data through a third dataflow gasket in route from the first dataflow gasket to the second dataflow gasket over the network.

20. The method of claim 15, further comprising reading the input memory using the second circuit block and writing the output memory using the first circuit block.

* * * * *